Figure 1:
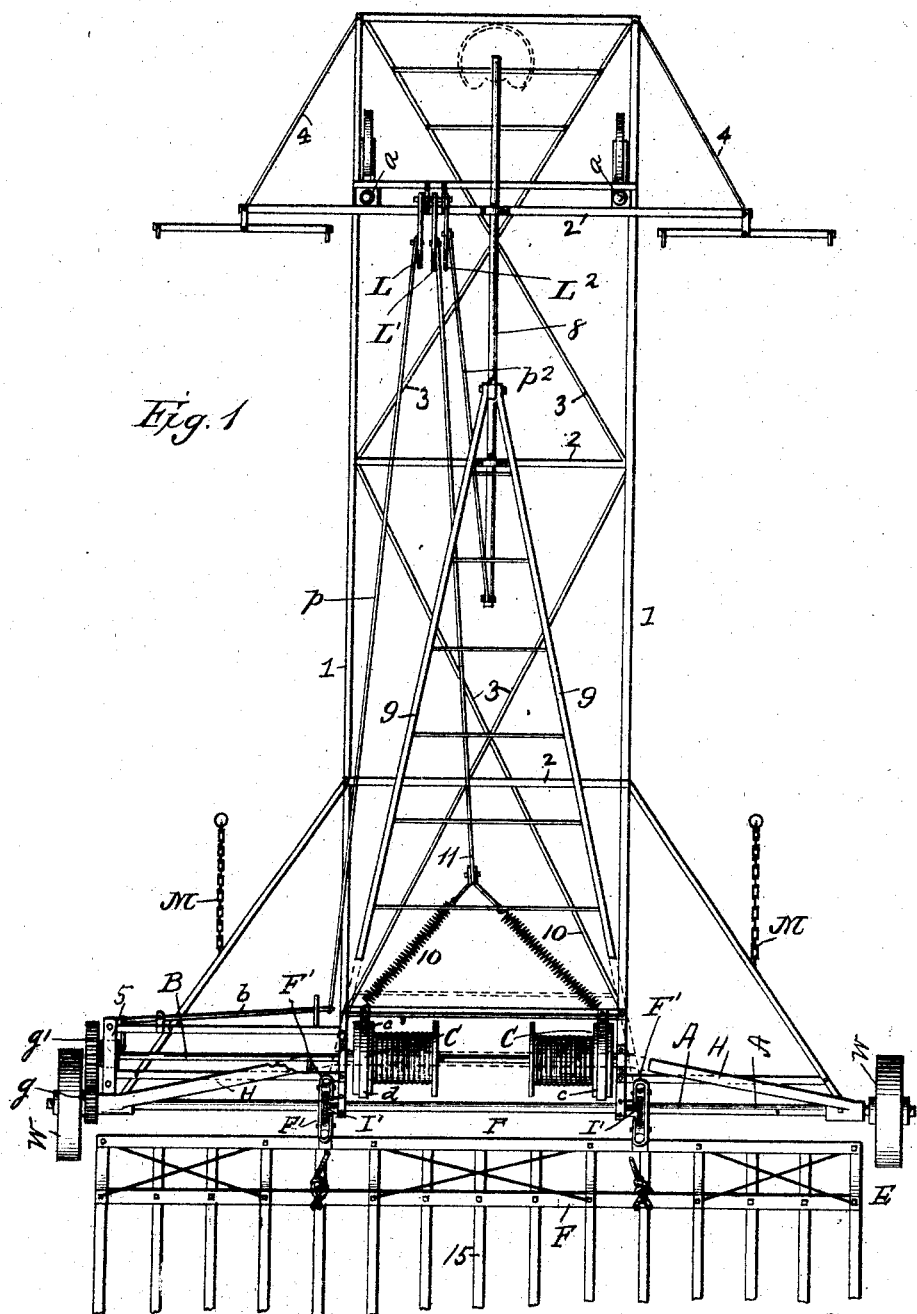

No. 864,472. PATENTED AUG. 27, 1907.
W. KOUNS.
HAY AND GRAIN RAKE, LOADER, AND STACKER
APPLICATION FILED JAN. 26, 1906.

5 SHEETS—SHEET 5.

WITNESSES:
INVENTOR
Wesley Kouns
BY E. M. Marble
His Attorney

UNITED STATES PATENT OFFICE.

WESLEY KOUNS, OF SALINA, KANSAS.

HAY AND GRAIN RAKE, LOADER, AND STACKER.

No. 864,472.　　　Specification of Letters Patent.　　　Patented Aug. 27, 1907.

Application filed January 26, 1906. Serial No. 298,081.

*To all whom it may concern:*

Be it known that I, WESLEY KOUNS, a citizen of the United States, residing at Salina, in the county of Saline and State of Kansas, have invented new and useful Improvements in Hay and Grain Rakes, Loaders, and Stackers, of which the following is a specification.

My invention relates to a hay and grain rake, loader and stacker, and consists in the construction and arrangement of the parts, fully described in the specification, illustrated in the drawings, and particularly set forth in the claims.

The objects of my invention are as follows: (1) To provide a machine for raking hay, and grain, and for loading, or stacking the same, which machine will at all times be under the control of the driver or operator. (2) A further object of my invention is to provide a machine which shall be effective and useful, light and strong, readily understood and easily managed by an ordinary man with a single team.

Figure 2:
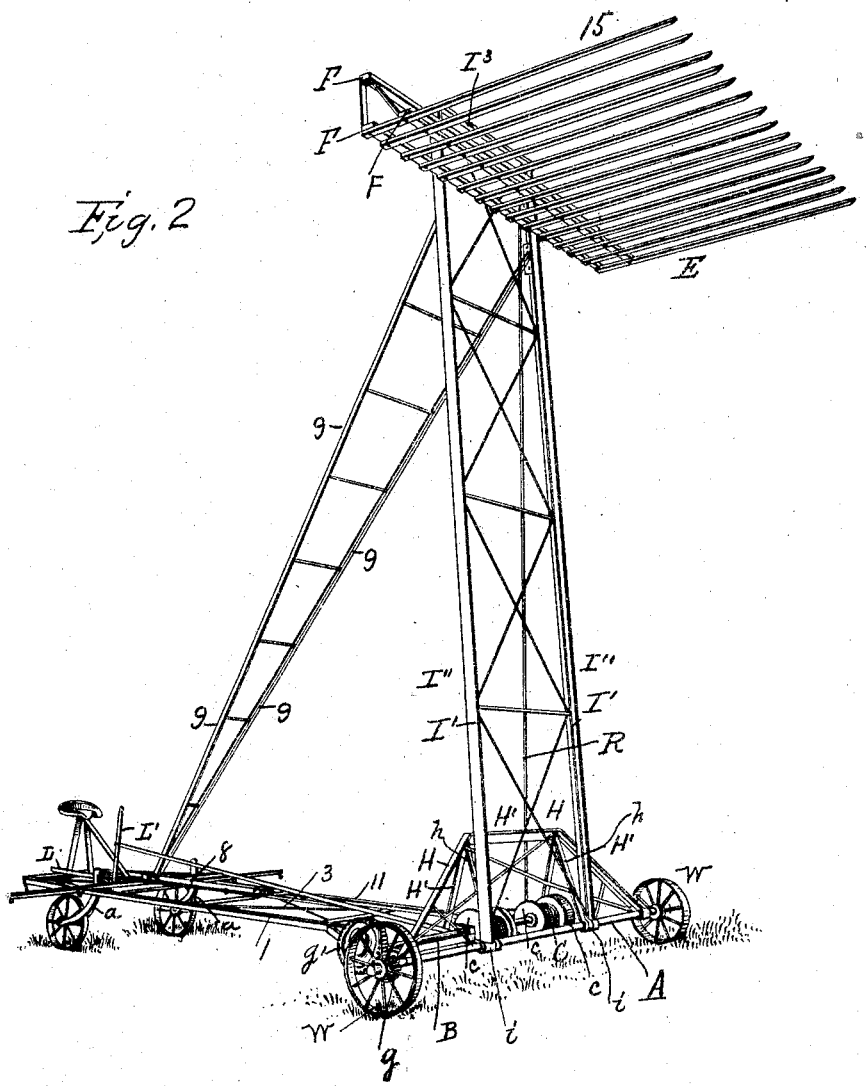
Figure 3:
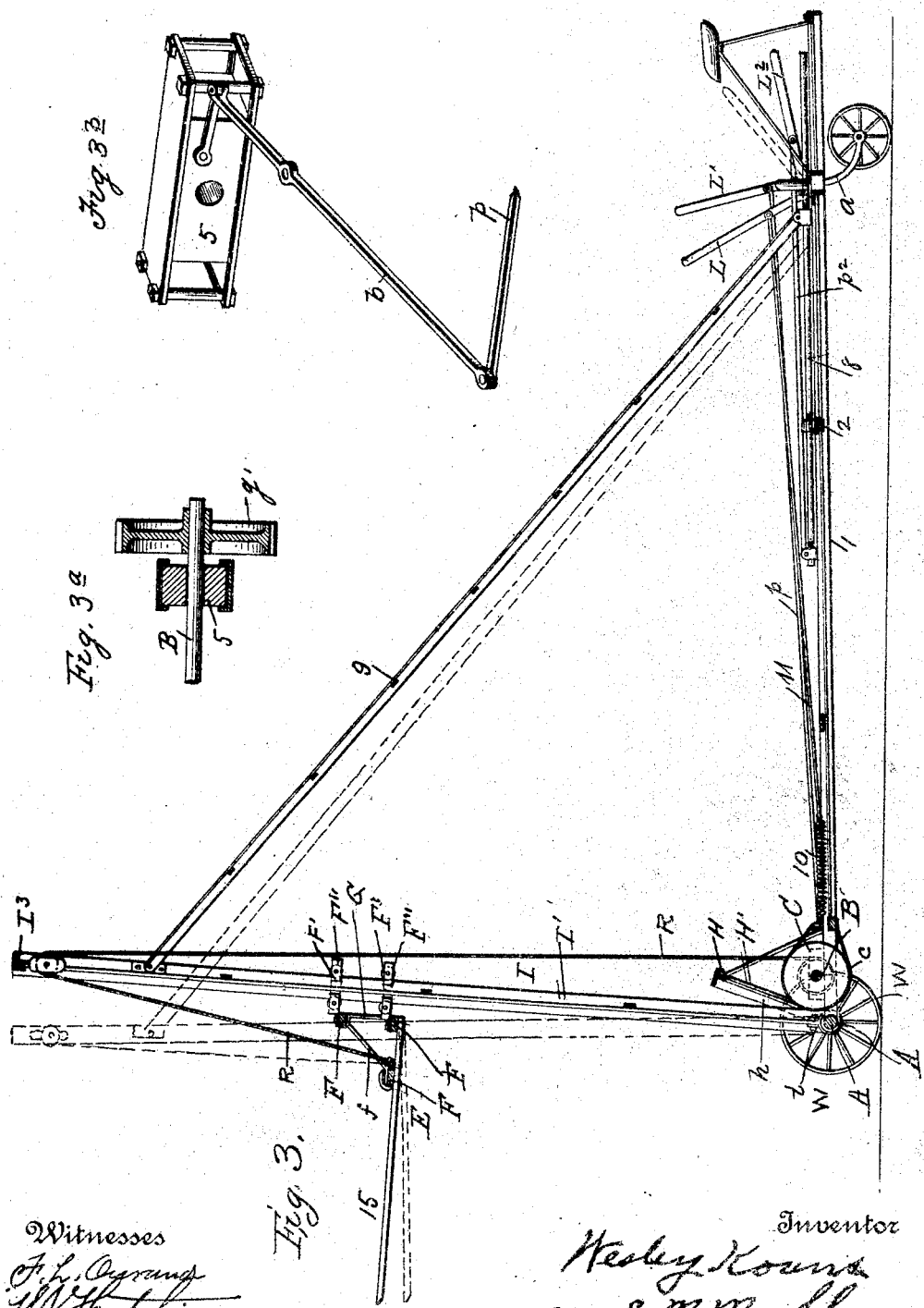
Figure 4:
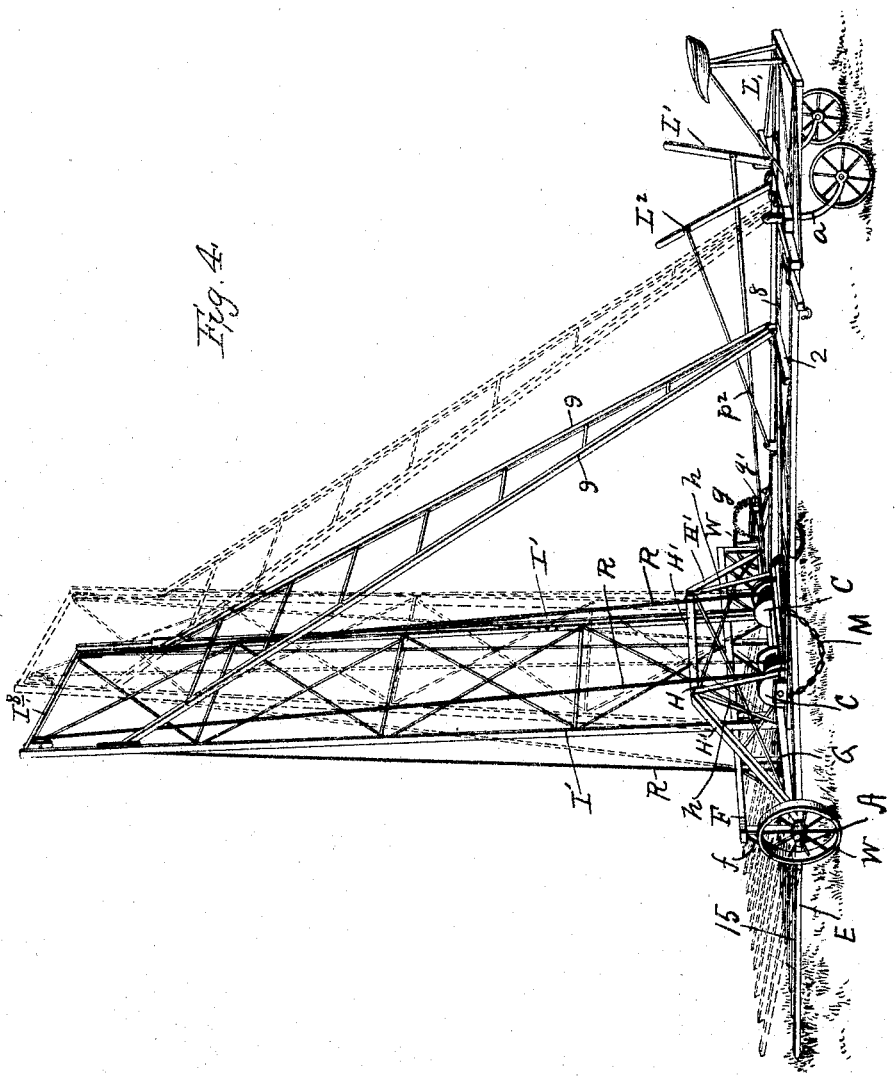
Figure 5:
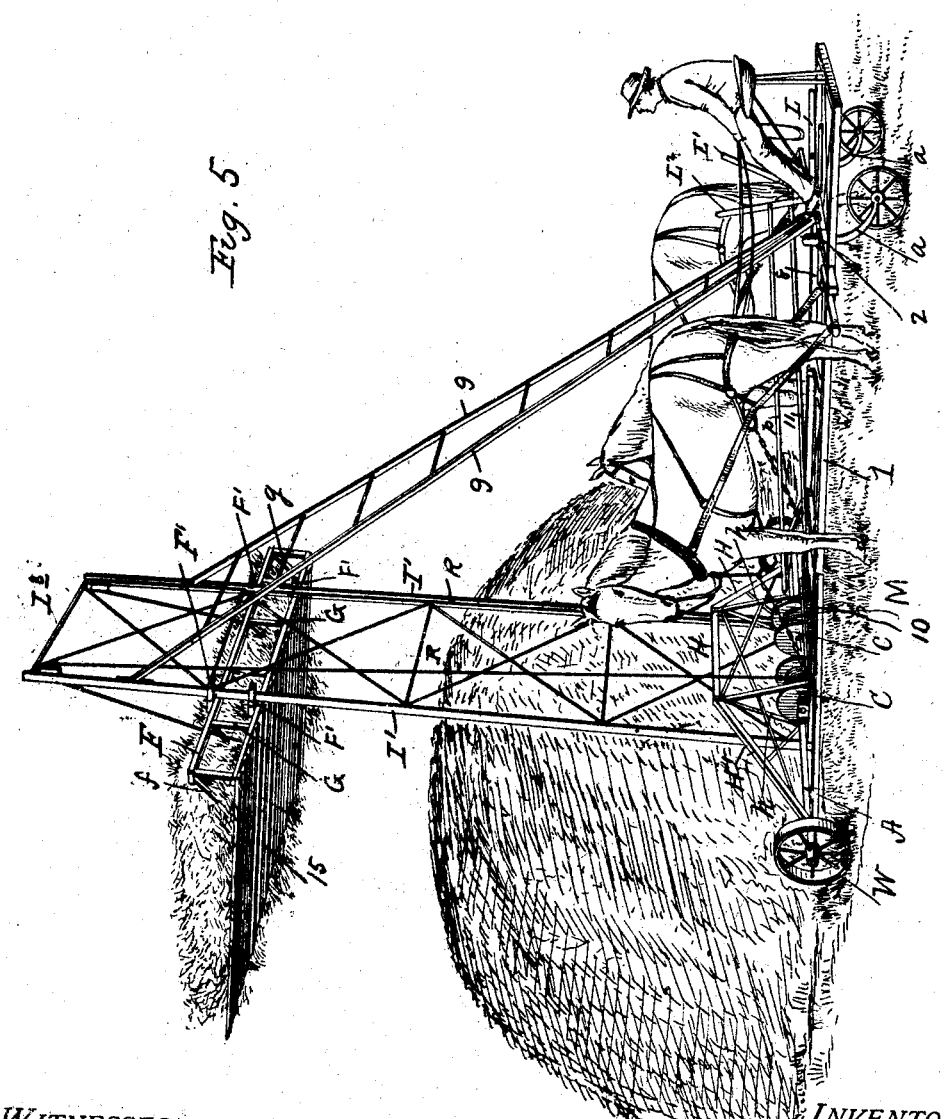

I accomplish the foregoing objects with the machine illustrated in the accompanying drawings, forming a part of this application, in which like letters and numerals indicate similar parts, as follows:

Figure 1 is a top plan view of my machine. Fig. 2 is a perspective view of my machine showing the rake-head and rake raised to the top of the derrick. Fig. 3 is a side elevation of my machine showing the rake elevated midway of the derrick; also in dotted lines the derrick, braces, and rake thrown forward and slightly downward, to show the position of the rake when discharging a load. Figs. 3$^a$ and 3$^b$ are enlarged views of the sliding boxes which will be fully explained. Fig. 4 is a perspective view of my machine, showing the same in working position with the rake down; and also in dotted lines, with the derrick tilted backward and the points of the rake-teeth elevated, for traveling or after discharging a load returning to take a new load. Fig. 5 is a perspective view of my machine, with load raised and ready to be discharged on a stack, the levers being set to hold the load until the driver is ready to discharge the same.

This machine consists of three parts, viz., the carriage and frame, the rake-head and rake, and the tilting derrick and braces.

I will first describe the carriage and frame, which for convenience I will hereafter call the frame. This frame is of rectangular form, (see Fig. 1), and is mounted in front on a tubular axle A, with drive wheels W W on each end. The rear end of the frame is mounted on two wheels carried by crank-arms $a$ $a$ secured to the push-beams.

The driver's seat is mounted on the rear end of the frame, as are also the pivoted levers L, L' and L$^2$, by which the driver controls the operation of the rake, the derrick, the slanting braces, and the drums.

On each side of the frame, are push-beams 1 1, preferably made of steel angle-bars, bolted and tied together by a series of steel cross-bars 2 2 and diagonal ties 3 3. Said push-beams extend back of the driver's seat and are secured in place by braces and ties as above mentioned, throughout their entire length. The front ends of said push-beams are secured to the main axle by proper clasps bolted to said beams. The double tree and swingle trees are supported on the push-beams 1 1, and the ends of the double tree are tied to the same by suitable tie-rods 4 4. The driver's seat is secured by springs on the frame thus formed near the end of the push-beams.

Near the front end of the frame, a counter-shaft B is mounted, extending from the left hand push-beam to and through the maple boxes 5 5, carrying on its right end a gear $g'$ to mesh with the gear $g$ fixed on the main axle, A. On the shaft B are secured two drums C C, having end flanges $c$ $c$. Midway the length of the frame is secured to a cross-bar 2, a sliding bar 8, extending back under the driver's seat, to which the slanting braces 9 9 are pivoted and the hand-lever L$^2$ through rod $p''$ is secured, for raising and lowering slanting braces 9 9.

Around the flanges of the drums C C, steel bands $d$ $d$ are held, being secured to the frame, to which the springs 10 10 are fastened, which springs are in turn secured to a rod 11 operated by hand-lever L', for tightening said bands and thereby locking said drums in place, to hold the rake in any desired position. The gear $g$ on the main axle A, and the gear $g'$ on counter-shaft B, are thrown into and out of gear by hand-lever L, rod $p$, and pivoted brace $b$, as shown in Figs. 3$^a$ and 3$^b$. This movement is due to the fact that the right hand end of said shaft is normally free, and can be pushed into and pulled out of gear at the option of the driver. By said gears $g$ $g'$ the drums C C are caused to revolve on counter-shaft B, and the hoisting ropes R R wound up, and the rake-head elevated.

The rake-head and rake E, consists of three cross-heads F F F, arranged in triangular form, from which project rake-teeth 15, secured in and to the lower cross-heads F F.

From the upper cross-head F, truss braces $f$ $f$ $f$ $f$ project downward, and are secured to the front lower cross-head F. Supports G G G G connect the rear and top cross-heads F F, and are bolted thereto. Thus a strong triangular rake-head is formed for the rake, as shown in Figs. 2, 3 and 5.

H is a truss-frame, consisting of three pieces H' H' H', the outer ends resting on axle A, which pieces are supported by a series of braces $h$ $h$ $h$, to strengthen said truss frame and to relieve the weight on the axle A, midway of its length.

Four arms F' F' F' F' are bolted to the cross-heads F F, said arms passing outside the derrick and supporting eight grooved pulleys F'', four on either side of derrick posts I' I', thus holding the rake firmly to the derrick, but permitting it to roll up and down freely and without binding at any point. See Figs. 2 and 5.

The derrick I is formed of two posts I' I' made of steel bars I'' I'' bolted together and having a top cross-head I''' for the rope sheaves, as shown in Figs. 3 and 5. The posts I' I' are connected by steel cross-heads and transverse braces to give them rigidity and strength. These posts I' I', forming the derrick I, are secured to axle A, by bearing sleeves $i$ $i$ passing down and around said axle, which sleeves are bolted to said posts. This derrick I is intended to tilt, or rock back and forth, to accommodate itself to rough ground, and also to permit of the raising and lowering of the rake-teeth in loading and unloading hay or grain.

Pivoted to the upper ends of the posts I' I' are the slanting braces 9 9, which extend downward and rearward and are again pivoted to the sliding bar 8, which braces are made of steel angles, and secured together by seven steel cross-ties forming steps, or a ladder for climbing to the top of the derrick to oil the ropes or pulleys.

The slanting or diagonal braces 9, 9, the sliding bar 8, and the hand-lever $L^2$ and rod $p^2$ constitute means for tilting the derrick I forward or back at will. It will be noted that the angle between the braces 9 and the bar 8 is very great, approximating, in fact, the angle at which the horizontal component of pressure applied to said bar in the direction of such braces is insufficient to overcome the friction due to such pressure—that is to say, approximating the critical angle of friction of such a transmission device; so that, according to the proportion of the parts, this transmitting device 8—9 is either an "irreversible transmitting device", i. e., one which transmits motion in one direction only, or is very nearly such an irreversible transmitting device. This is very important, since it permits control of the position of the derrick with relatively little effort on the part of the operator, the bulk of the thrust of the braces against the bar 8 being absorbed in the transmitting device and very little, if any, being transmitted to the hand lever $L^2$, while at the same time it is easy to shift the derrick as desired by means of lever $L^2$. It will also be noted that in its extreme forward and backward positions lever $L^2$ is nearly horizontal and rod $p^2$ nearly in line with bar 8. This makes the device self-locking in its extreme adjustments.

In practice, it may be desirable not to have the transmitting device 8—9 completely "irreversible", because too great rigidity is not desirable when moving over rough ground; some slight "give" reduces the stresses on the derrick and braces. The operator, with his hand on lever $L^2$, can easily control this movement.

The operation of this machine is easily understood and may be readily managed. I will, however, state briefly the steps necessary to be taken in order to accomplish the desired results. To adjust the machine to rake hay, or grain, the rake-teeth should be placed in the position shown in Fig. 4. To do this, lever $L^2$ should be pushed forward as shown in said Fig. 4, thus thrusting the slanting braces 9 9 against the derrick I moving it forward to a slight incline, as shown in Fig. 4, and forcing the rake-teeth to point downward as shown in said figure. When the rake has taken a load of hay, or grain, which must be carried to a wagon or stack the same lever will be pulled backward by the driver, causing the slanting braces 9 9, the derrick I and the teeth 15, to take the position shown in dotted lines in said Fig. 4. The machine may then be driven near to a stack or wagon, as shown in Fig. 5, and the load raised to a proper height for unloading. To raise the load, the derrick I is first drawn back to a vertical position as shown in Fig. 3, which is done by drawing lever $L^2$ backward with its rod $p''$ and sliding bar 8 and the braces 9 9. When the derrick, braces, and lever have been placed in the position shown in said figure, lever L will be pushed backward bringing gears $g$ $g'$ into contact. The team being now started, the drums C C on the shaft B will be revolved and the ropes R R secured to the drums C C and rake E will be wound up and the rake E will be elevated to any desired position as shown in Figs. 2, 3 and 5. To hold the load and rake in elevated position, the lever L' will be pulled backward, clamping the bands $d$ $d$ to the flanges $c$ $c$ on the drums C C, and thus locking the rake and load in place, and at the same time lever L is pulled back, disengaging gears $g$ and $g'$. The machine may then be moved forward, with the load held in the elevated position, until the proper position for discharging the load is reached. To discharge the load the lever $L^2$ will be pushed forward and with it bar 8 and braces 9 9, when the rake E will be lowered as shown in Fig. 3, permitting the load to slip off readily from the rake; and the team may now be backed up, pulling the rake by the chains M M from under the load. The load having been discharged, the gears $g$ $g'$ are thrown out of gear, permitting the rake head and rake E to be safely lowered to the position shown in Fig. 4, by pushing forward lever L' gently releasing bands $d$ $d$ on flanges $c$ $c$ of drums C C until the rake is in proper position.

The operation of the machine as above set forth may be carried out by any ordinary farm-hand.

Having now fully described and illustrated my invention and machine and its mode of operation, what I claim and desire to secure by Letters-Patent is:

1. In a machine of the class described, the combination with a supporting frame, and a tilting derrick thereon, of operating means for moving said derrick forward and backward, comprising an operating member adapted for operation by the operator of the machine, and transmitting means approximately irreversible in character between said operating member and derrick and comprising friction means resisting reactions on said operating member.

2. In a machine of the class described, the combination with a supporting frame, and a tilting derrick thereon, of operating means for moving said derrick forward and backward, comprising an operating member, and transmitting means between the same and the derrick comprising driving and driven members relatively arranged at an angle approximating the critical angle of friction of the driving member.

3. In a machine of the character described, the combination with a supporting frame, and a tilting derrick thereon, of a bar movable longitudinally along said frame, a diagonal brace pivoted to said bar and derrick, and a pivoted hand lever connected to said bar to shift the same and thereby the derrick.

4. In a machine of the character described, the combination with a supporting frame, of a tilting derrick, a sliding bar moving in the supporting frame, a slanting brace pivoted to the derrick and said sliding bar, and a hand lever and rod for operating said bar, brace and derrick, substantially as described.

5. In a machine of the character described, the combination of a base, a derrick upright pivoted to the base, a brace pivoted to the upright, a bar slidingly mounted on the base and pivoted to the brace, and an operating lever connected to said bar, substantially as described.

6. In a machine of the character described, the combination of a base, a derrick upright pivoted to the base, a brace pivoted to the upright, a bar slidingly supported on the base and connected to the brace, and hand-operable means for sliding the said bar to shift the position of the upright, substantially as described.

7. In a machine of the character described, the combination with a supporting frame, a tilting derrick thereon, and a rake and rake-head mounted to move up and down on said derrick, of a bar movable longitudinally along said frame, a diagonal brace pivoted to said bar and derrick, an operating lever connected to said bar, and means for raising and lowering said rake on said derrick.

8. In a machine of the character described, the combination with the supporting frame of a derrick I, braces 9, 9 therefor, sliding bar 8 connected to said braces, rod $p^2$ connected to said sliding bar and hand-lever $L^2$ connected to said rod, substantially as described.

9. In a machine of the character described, the combination with the supporting frame of the rake and rake-head E, the derrick I carrying said rake and rake-head, the braces 9, 9, connected with said derrick, the sliding bar 8, connected to said braces, the hand-lever $L^2$, and the rod $p^2$ connecting said lever and bar 8.

10. In a machine of the class described, the combination with a supporting frame, and a tilting derrick thereon, of operating means for moving said derrick forward and backward, comprising an operating member adapted for operation by the operator of the machine, and mechanism transmitting motion from said operating member to said derrick, including friction devices resisting backward reactions upon said operating member.

11. In a machine of the class described, the combination with a supporting frame, and a tilting derrick thereon, of operating means for moving said derrick forward and backward, comprising a hand lever, and mechanism for transmitting motion from said hand lever to said derrick, including friction means resisting backward reactions on said hand lever.

In testimony whereof I affix my signature, in presence of two subscribing witnesses.

WESLEY KOUNS.

Witnesses:
W. T. WELCH,
FRED H. QUINCY.